No. 648,461. Patented May 1, 1900.
A. I. JACOBS.
TUBE CLAMP.
(Application filed June 1, 1899.)
(No Model.)
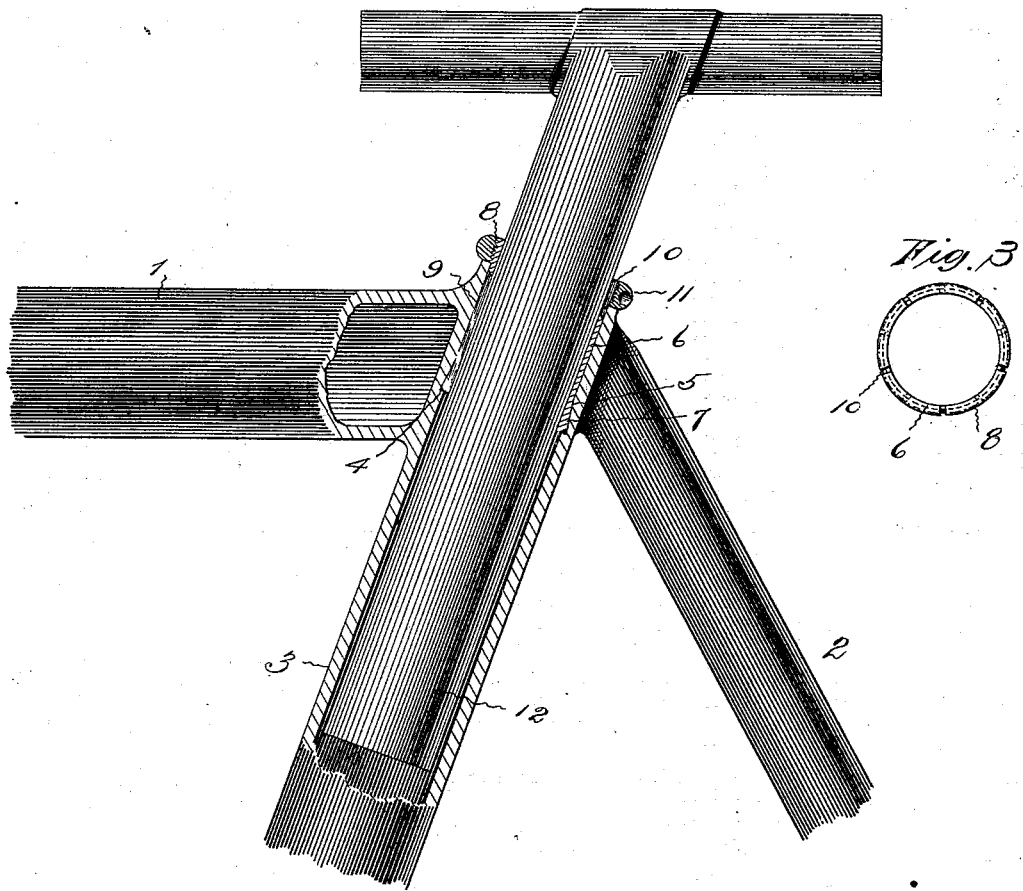
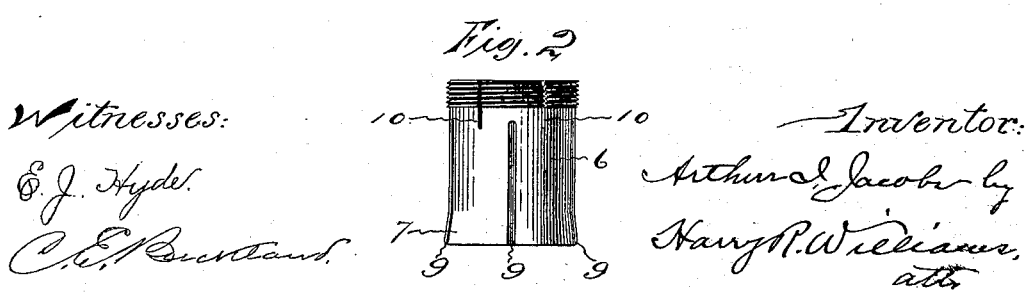
Witnesses:
E. J. Hyde.
C. E. Buckland.
Inventor:
Arthur I. Jacobs, by
Harry P. Williams,
atty.

UNITED STATES PATENT OFFICE.

ARTHUR I. JACOBS, OF HARTFORD, CONNECTICUT.

TUBE-CLAMP.

SPECIFICATION forming part of Letters Patent No. 648,461, dated May 1, 1900.

Application filed June 1, 1899. Serial No. 718,998. (No model.)

*To all whom it may concern:*

Be it known that I, ARTHUR I. JACOBS, a citizen of the United States, residing at Hartford, in the county of Hartford and State of Connecticut, have invented certain new and useful Improvements in Tube-Clamps, of which the following is a specification.

The clamp which forms the subject of this invention is one of the class that are arranged for holding a tube inside of another tube in any desired relation, and it is particularly applicable for holding the supporting-post of a bicycle-saddle at the required height in the seat-tube of the frame.

The object of this invention is to provide a clamp of this nature which will be inexpensive to manufacture, simple to use, light in weight, and attractive in appearance, and one which will firmly and strongly hold the inner tube in such manner that it will not be marred and cannot work loose and let down the saddle.

Figure 1 of the accompanying drawings represents a part of a bicycle-frame with a saddle-post held by a clamp that embodies the invention, portions of the tubing of the frame being broken away to expose the clamping parts. Fig. 2 is a side view of the clamping-sleeve that is represented in Fig. 1, and Fig. 3 is an end view of this sleeve.

The upper center tube 1 and the upper rear fork-tube 2 are illustrated as brazed in a common manner to the saddle-post tube 3. A groove 4 is formed in the interior wall of the seat-post tube a little distance below the upper end. The upper end wall of this groove is formed on an incline, so that a circular interior wedge 5 will result.

The exterior diameter of the sleeve 6 is such that the sleeve closely fits the interior of the saddle-post tube. The body of the sleeve is cylindrical, but the lower end is thickened, so as to form the exterior wedge 7, that fits the groove in the seat-post tube. The upper end of the sleeve is provided with an exterior V-shaped thread 8. Slots 9 are made in this sleeve from the bottom upwardly, so that the lower wedge end will be yielding, and slots 10 are made in the upper end of the sleeve, so that the threaded part will be yielding. These slots are so cut that they alternate with each other. A collar 11, provided with a V-shaped thread, is fitted upon the upper end of the sleeve, so that when screwed in position it will butt against the end of the seat-post tube. The sleeve is inserted into the seat-post tube until the lower wedge end enters the wedge groove in the interior wall of the tube and the collar is turned upon the slitted and threaded end of the sleeve. The slots permit the lower end of the sleeve to contract while it is being inserted and then to expand into the groove, so that the inclined walls of the groove and sleeve will coöperate when the clamp is used.

A seat-post tube 12, passed through the sleeve, can be clamped at any desired height by simply turning the collar until it, by contact with the upper end of the seat-post tube, draws the sleeve outwardly sufficiently to cause the sleeve to bind against the seat-post. As the sleeve is drawn outwardly by the turning of the collar the circular wedge surface in the tube and the circular wedge surface on the outside of the sleeve engage in such manner that the lower slitted end of the tube is contracted and forced against the seat-post. The turning of the collar upon the threaded end of the sleeve by contact with the end of the tube not only draws outwardly the sleeve and by the resulting engagement of the wedge surfaces of the interior of the tube and the exterior of the sleeve causes the contraction of the lower inner end of the sleeve against the seat-post, but also causes the upper slitted end of the sleeve to be contracted, so as to assist in holding the seat-post. By means of this construction the seat-post is held at both ends of the sleeve, and this holds the post from any possible sidewise movement which will cause a loosening. The only part of the clamp that is visible is the collar, and this does not project so as to catch dirt or wear the clothing. The collar can be ornamented, so as to form a finishing trim for the end of the tube. The seat-post with this arrangement can be bound very tightly with little effort, and it requires but little movement to loosen, so that the seat-post may be adjusted.

I claim as my invention—

An improved clamp consisting of a tube having in its interior wall a tapering groove that is deepest at its lower end, a sleeve fitting the interior of the tube and having at its outer end an exterior thread and at its inner end an exterior circular tapering surface that is greatest in diameter at its lower end, said sleeve being slitted so as to be compressible, and a thread-collar fitting the threaded end of the sleeve, substantially as specified.

ARTHUR I. JACOBS.

Witnesses:
H. R. WILLIAMS,
C. E. BUCKLAND.